UNITED STATES PATENT OFFICE.

JOHN WILSON, OF NEW YORK, N. Y.

METHOD OF PURIFYING WATER.

SPECIFICATION forming part of Letters Patent No. 619,917, dated February 21, 1899.

Application filed January 26, 1898. Serial No. 668,096. (No specimens.)

*To all whom it may concern:*

Be it known that I, JOHN WILSON, of New York, (Brooklyn,) county of Kings, and State of New York, have invented a certain new and useful Improvement in Methods of Purifying Water, of which the following is a specification.

The object of my improvement is to render water potable or to increase its potability and also to purify it for other purposes—as, for instance, for laundry use or employment in steam-generators.

This improvement relates more particularly to water which is not argillaceous or water not containing alumina or clay in solution or suspension, or both.

In carrying out my improvement I take such water, whether under atmospheric pressure, pneumatic pressure, hydraulic pressure, or any other pressure, and add thereto an aqueous solution of sodic chlorid (NaCl) and alumina or other equivalent argillaceous substance. This I use in proportions suitable to the character of the water to be purified, and hence it is impossible to give definite proportions. For example, I would suggest that for water having twenty grains of impurities to the gallon I may successfully use five grains of sodic chlorid and ten grains of alumina or other equivalent argillaceous substance. After this treatment the water must be freed from impurities by settling, decantation, or filtration by means of any desirable apparatus.

Water containing impurities differing in amount from the example given may be treated by taking a portion of such water in a graduated test-tube, adding one grain of an aqueous solution of sodic chlorid and a grain of the argillaceous substance, and if that amount be insufficient to precipitate adding another grain of each and proceeding in that manner until a precipitate is formed. Additions of the aqueous solution of sodic chlorid and the argillaceous substance will be made until precipitation shall have ceased. This process will be pursued with such rapidity that the results will not be dependent upon the settling of such impurities as may separate by gravitation. Thus I shall obtain the proper amount of aqueous solution of sodic chlorid and argillaceous substance for the impurities. Having thus determined the proportion of such aqueous solution necessary for the treatment of any water, I employ that proportion.

The sodic chlorid and alumina or other equivalent argillaceous substance may be introduced separately or together.

The principle of this invention consists in that as the soda, chlorid, and alumina or other equivalent argillaceous substance is added chlorid of alumina is formed, which precipitates quickly, and the adding of this quick precipitant tends to hasten the precipitation of the other suspended impurities.

Wherever in my specification I use the term "alumina or other equivalent argillaceous substance," it is to be understood as not meaning any of the alums.

Any suitable apparatus may be used for carrying out my improvement.

What I claim as new, and desire to secure by Letters Patent, is—

The method of purifying non-argillaceous water consisting of introducing into it sodic chlorid and alumina in quantities sufficient to precipitate the impurities, and afterward separating the impurities from the water.

In testimony whereof I have signed my name to this specification in the presence of two subscribing witnesses.

JOHN WILSON.

Witnesses:
W. LAIRD GOLDSBOROUGH,
D. A. DAVIES.